(12) United States Patent
Wachter

(10) Patent No.: US 9,969,363 B1
(45) Date of Patent: May 15, 2018

(54) SYSTEM AND METHOD FOR WIPING A CIRCULAR SURFACE

(71) Applicant: GM Global Technology Operations LLC, Detroit, MI (US)

(72) Inventor: Brian R. Wachter, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/352,649

(22) Filed: Nov. 16, 2016

(51) Int. Cl.
*B60S 1/56* (2006.01)

(52) U.S. Cl.
CPC .................................... *B60S 1/566* (2013.01)

(58) Field of Classification Search
CPC ...................................................... B60S 1/566
See application file for complete search history.

(56) References Cited

U.S. PATENT DOCUMENTS

| | | | | |
|---|---|---|---|---|
| 2014/0300744 A1* | 10/2014 | Kasahara | ............... | H04N 5/232 348/148 |
| 2017/0210351 A1* | 7/2017 | Ghannam | ................. | B60S 1/50 |
| 2017/0313288 A1* | 11/2017 | Tippy | ...................... | B60S 1/566 |

* cited by examiner

*Primary Examiner* — Tuan Ho

(57) ABSTRACT

A wiping system is disclosed for use with a circular sensor having a circular lens. The system may have an electric motor having an armature, and a wiping subsystem for wiping the lens in a circular motion. The wiping system may be driven rotationally by the armature of the electric motor and orientated so as not to obstruct a field of view of the circular sensor. The motor armature may be rotated at a speed in accordance with a circular scanning speed of the sensor.

11 Claims, 3 Drawing Sheets

SYSTEM AND METHOD FOR WIPING A CIRCULAR SURFACE

FIELD

The present disclosure relates to systems and methods for wiping a circular surface, and more particularly to a system and method which is able to wipe a circular sensor surface over a full 360 degree path of travel.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

At the present time there is a growing interest in the development and use of autonomous vehicles. Autonomous vehicles typically make use of one or more LIDAR (Light Detection and Ranging) sensors to provide real time detection of objects around the perimeter of the vehicle while the vehicle is in use. Typically, a circular LIDAR sensor is disposed on a surface of the vehicle and includes a laser light generating subsystem that generates laser light pulses over a predetermined arc, for example 30-75 degrees, and which is scanned about a 360 degree field of view (FOV) around the perimeter of the vehicle. The LIDAR sensor also typically makes use of a housing having a circular lens through which the laser light pulses are emitted and received. It is important that the circular lens is kept clean for the LIDAR sensor to operate in its intended manner. Dust, dirt, mud, slush, sleet, rain water and other contaminants that collect on the lens of the LIDAR sensor can adversely affect its operation. Accordingly, there is a need for some system and/or method which is able to clean a substantial portion of a circular lens of a circular LIDAR sensor while the vehicle is in use, and which does not otherwise affect the operation of the LIDAR sensor or obstruct the transmission or reception of laser light pulses generated by the LIDAR sensor.

SUMMARY

In one aspect the present disclosure relates to a wiping system for use with a circular sensor having a circular lens. The system may comprise an electric motor having an armature, and a wiping subsystem for wiping the lens in a circular motion. The wiping system may be driven rotationally by the armature of the electric motor and orientated so as not to obstruct a field of view of the circular sensor. The motor armature may be rotated at a speed in accordance with a circular scanning speed of the sensor.

In another aspect the present disclosure relates to a wiping system for use with a circular LIDAR sensor having a circular lens. The system may comprise an electric motor disposed adjacent the circular LIDAR sensor, and a wiping subsystem having a wiper blade for wiping the lens of the circular LIDAR sensor in a circular motion. The wiping system may be driven rotationally by the electric motor at the same rotational speed as the LIDAR sensor is scanned. The wiper blade may be arranged at least about 0.5 degree ahead of a field of view of the LIDAR sensor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
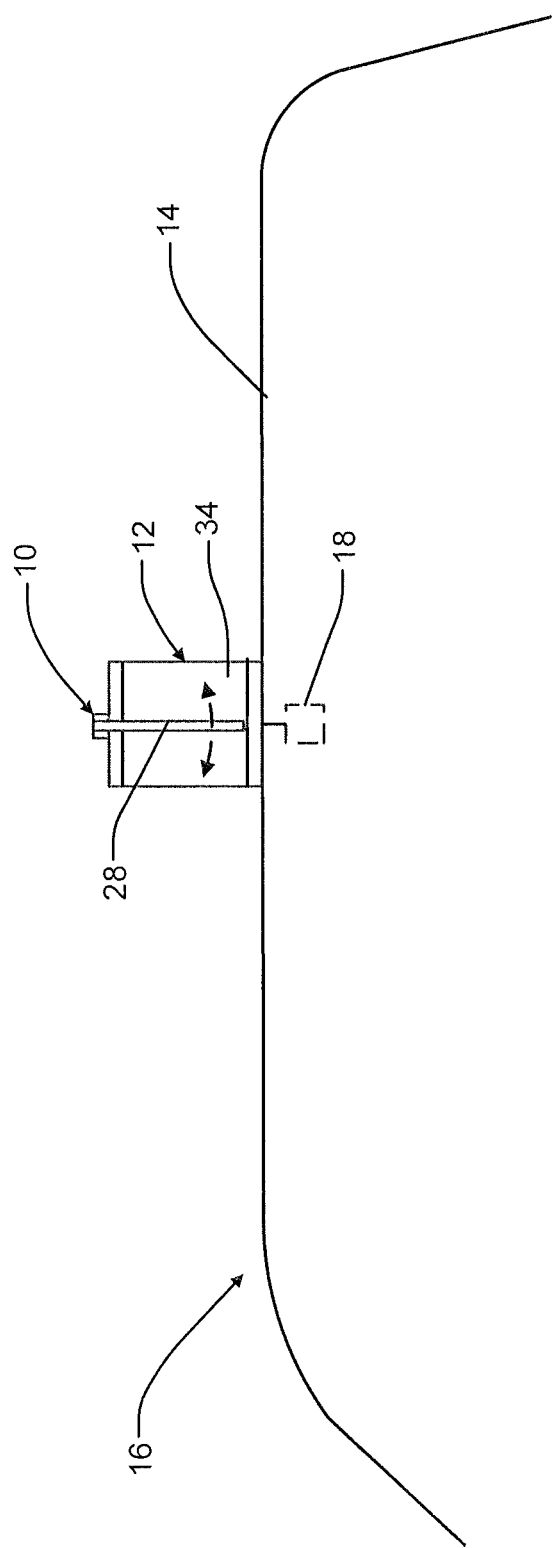
FIG. 1 is a side view of a vehicle having a LIDAR sensor mounted on a vehicle, and further illustrating one embodiment of a wiping system in accordance with the present disclosure for wiping a circular lens surface of the LIDAR sensor.

Referring to FIG. 1 there is shown one embodiment of a wiping system 10 in accordance with the present disclosure. The wiping system 10 in this example is positioned adjacent to, and is integrated into the construction of, a LIDAR (Light Detection and Ranging) sensor 12. The LIDAR sensor 12 is shown positioned on a surface 14 of a vehicle 16, although it will be appreciated that the wiping system 10 does not restrict the use of the LIDAR sensor 12 to use on only the surface 14. The wiping system 10 can be used with the LIDAR sensor 12 at other locations on the vehicle 16 if desired.

Figure 2:
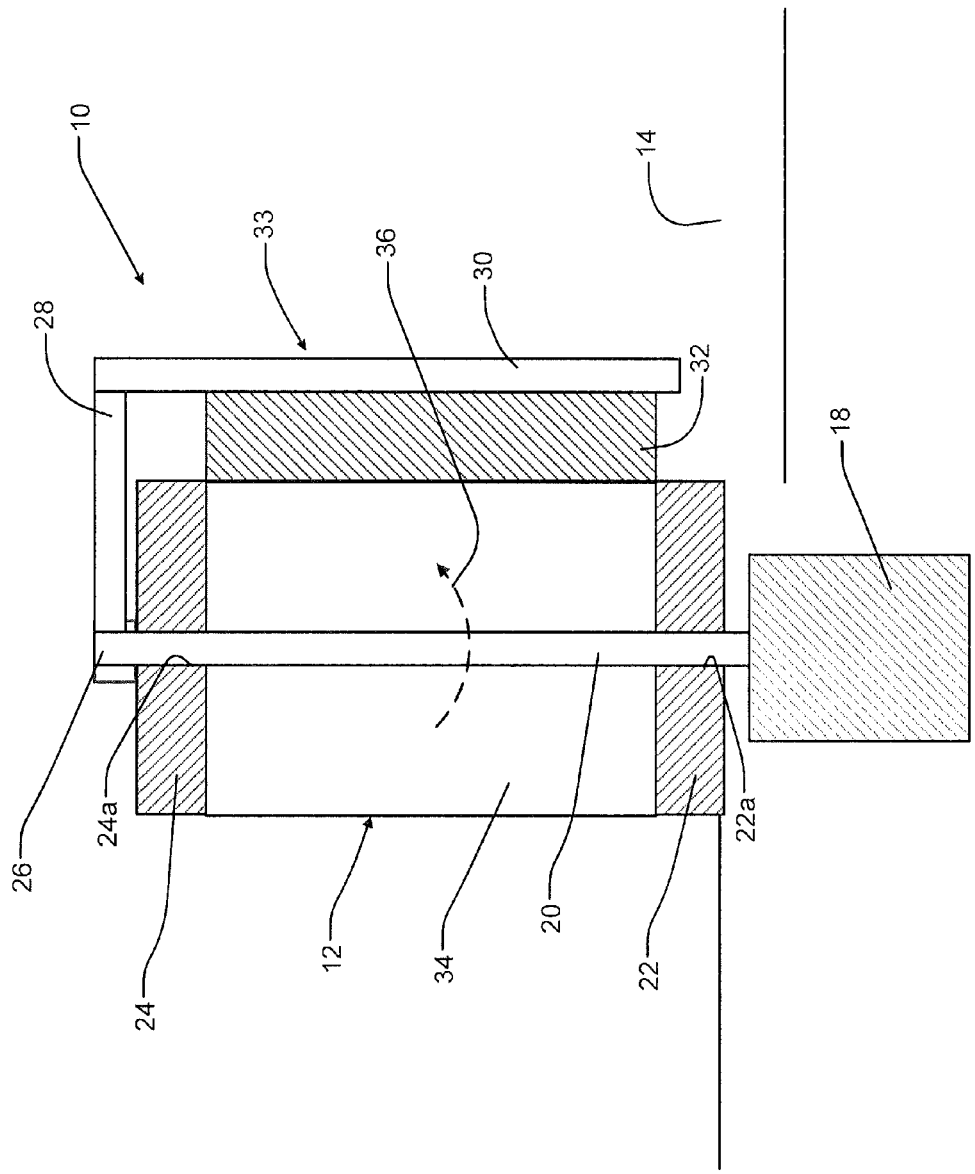
FIG. 2 is a high level, cross sectional side view of the wiping system of FIG. 1 also showing the LIDAR sensor in simplified cross sectional form.

Referring to FIG. 2, the wiping system 10 may include a motor 18, for example a DC powered motor, having an armature 20 which extends through an opening 22a in a lower housing portion 22 and through an opening 24a in an upper housing portion 24 of the LIDAR sensor 12. Alternatively, the motor 18 may even be housed in one or the other of the housing portions 22 and 24 if the housing portion 22 or 24 is of sufficient dimensions. In this example, however, the motor 18 is shown mounted externally of the LIDAR sensor 12 slightly below the surface 14 of the vehicle 16. A distal end 26 of the armature 20 may be fixedly coupled to a cantilevered member 28, which in turn may be fixedly coupled to a wiper frame element 30. The wiper frame element 30 may be coupled to a wiper blade 32, for example a flexible rubber or synthetic wiper blade similar to a conventional windshield wiper blade. The cantilevered member 28 has a length that places the wiper blade 32 in contact with a circular lens 34 of the LIDAR sensor 12 when the wiper blade is coupled to the cantilevered member. The armature 20 of the electric motor 18 may extend generally parallel to the lens 34, and therefore rotation of the armature produces a corresponding rotation of the wiper blade 32 which maintains the wiper blade in constant contact with the lens. The wiper blade 32 preferably has a length which is similar to a height of the circular lens 34 which enables it to wipe all, or substantially all, of a surface area of the circular lens. Together the cantilevered member 28, the wiper frame element 30 and the wiper blade 32 may be viewed as forming a wiping subsystem 33. Alternatively, the cantilevered member 28 may be connected to the armature 20 below the LIDAR sensor 12. In this example, however, the cantilevered member 28 is shown connected above the LIDAR sensor 12.

The motor armature 20 is driven rotationally, for example in accordance with dashed arrow 36, which drives the cantilevered member 28, the wiper frame element 30 and the wiper blade 32 in a circular path over the lens 34 of the LIDAR sensor 12. If the motor 18 is a reversible stepper motor, then an oscillating, circular wiping pattern could also be generated. Whether a continuous circular motion or an oscillating circular motion is used, the wiper blade 32 wipes substantially the entire surface of the lens 34. The motor 18 is preferably in communication with a wiring harness (not shown) of the vehicle 16, which allows the motor to communicate with and be controlled by an electronic controller, such as an on-board vehicle computer, of the vehicle 16. In this manner the motor 18 can be controlled automatically in accordance with operation of the vehicle. It is also possible that the motor armature 20 could be used to rotate the sensing element(s) of the LIDAR sensor 12, thus removing the need for a separate motor for rotating the sensing element(s). It is also possible that the motor armature 20 could be used to rotate the lens 34 against a stationary wiping element, such as a stationary mounted wiper blade 32. This stationary wiping element could be positioned within a blind zone of the LIDAR sensor 12.

Figure 3:
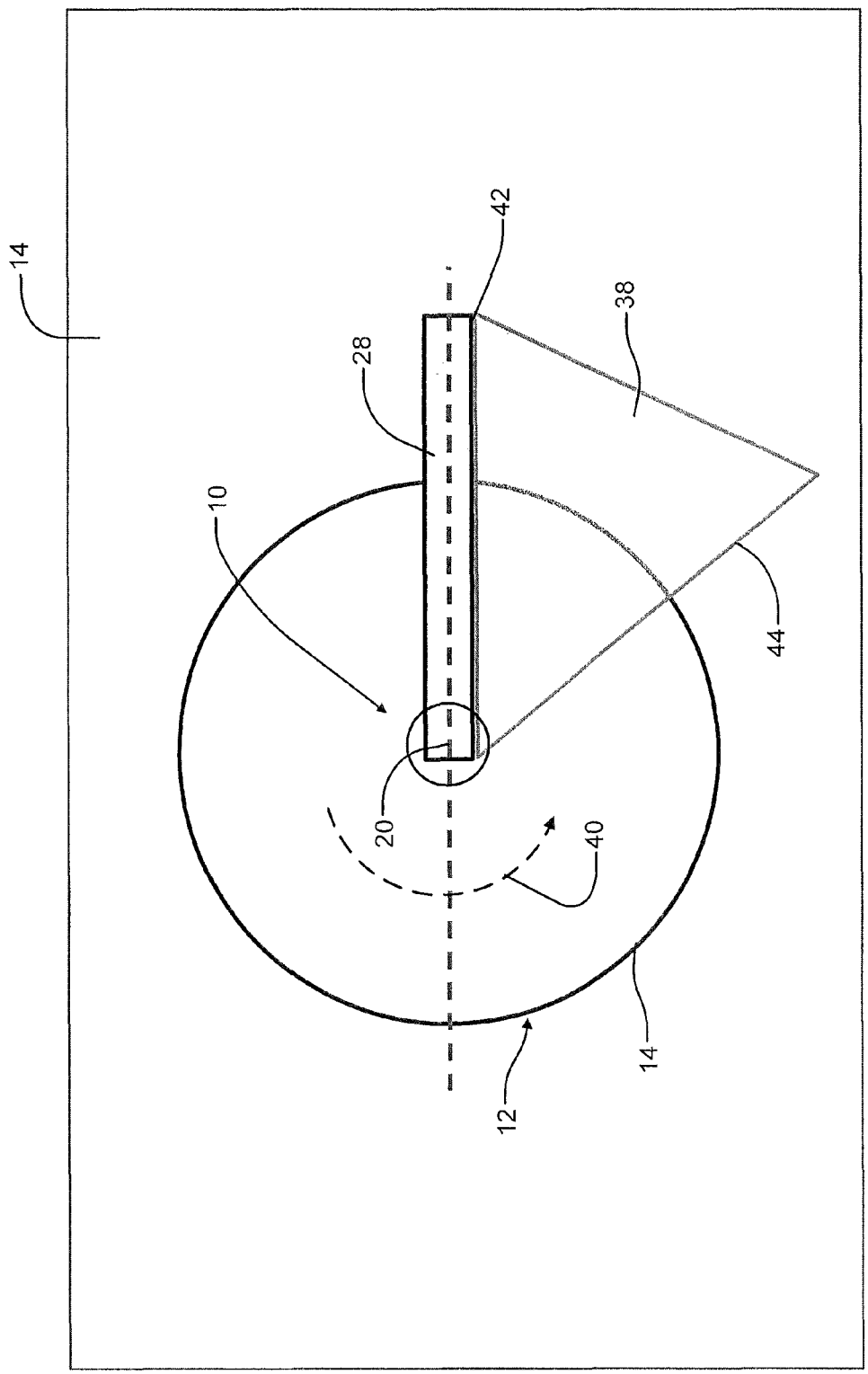
FIG. 3 is a high level top view looking down on the wiping system.

With reference to FIG. 3, a field of view (FOV) 38 of the LIDAR sensor 12, which is rotating in accordance with directional arrow 40, needs to maintained clear at all times during operation of the LIDAR sensor for the LIDAR sensor to operate properly. Accordingly, in this example the cantilevered member 28 is orientated so that it just slightly ahead (e.g., at least about 0.5-1.0 degree) of a leading edge 42 of the FOV 38 of the LIDAR sensor 12 as the sensor scans in a circular path. Alternatively, the cantilevered member 28 could be positioned at a trailing edge 44 of the FOV 38. In either position, the cantilevered member 28 does not obstruct any portion of the FOV 38 of the LIDAR sensor 12 during its operation. Preferably, the motor armature 20 is driven rotationally at the same speed that the LIDAR sensor 12 is scanned so that the wiper blade 32 never obstructs the FOV 38 of the LIDAR sensor during its operation.

With reference to FIG. 2, an active wiping system is illustrated with the wiper blade 32 contacting the lens 34. As the vehicle 16 will not always require the lens 34 to be wiped, a method to disengage and/or engage the wiper blade 32 to the lens 34 could be implemented. The cantilevered element 28 could utilize a mechanism, such as telescoping members or hinges, to remove and/or apply the wiper blade 32 to the lens 34. This mechanism could be controlled by the rotational speed of the armature 20, or through external operating forces such as pneumatics, hydraulics, or additional motors. The wiper blade 28 could continue to rotate while disengaged from the lens 34, or remain stationary in a FOV 34 blind zone. This mechanism will help prolong the functional life of the wiper blade 32 and avoid dry wiping noises.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A wiping system for use with a circular sensor having a circular lens, the system comprising:
   an electric motor having an armature;
   a wiping subsystem for wiping the lens in a circular motion, the wiping subsystem being driven rotationally by the armature of the electric motor and orientated so as not to obstruct a field of view of the circular sensor; and
   the armature being rotated at a speed in accordance with a circular scanning speed of the sensor.

2. The wiping system of claim 1, wherein the armature extends through the sensor.

3. The wiping system of claim 1, wherein the wiping subsystem includes:
   a cantilevered arm coupled to the armature;
   a wiper frame element supported by the cantilevered arm adjacent the lens of the sensor; and
   a wiper blade, supported by the wiper frame element, which wipes the lens of the sensor.

4. The wiping system of claim 3, wherein the wiper frame element is positioned at least about 0.5 degree ahead of a field of view of the sensor.

5. The wiping system of claim 1, wherein the wiping system is arranged to extend partially over an upper housing portion of the sensor.

6. The wiping system of claim 1, wherein the electric motor is positioned below a lower housing portion of the sensor, and the armature extends completely through the sensor generally parallel to the lens of the sensor.

7. A wiping system for use with a circular LIDAR sensor having a circular lens, the system comprising:
   an electric motor disposed adjacent the circular LIDAR sensor;
   a wiping subsystem having a wiper blade for wiping the circular lens of the circular LIDAR sensor in a circular motion, the wiping subsystem being driven rotationally by the electric motor at the same rotational speed as the LIDAR sensor is scanned; and wherein the wiper blade is arranged at least about 0.5 degree ahead of a field of view of the LIDAR sensor.

8. The wiping system of claim 7, wherein the electric motor includes an armature, and the electric motor is disposed adjacent to but apart from the LIDAR sensor such that the armature extends through an internal area of the LIDAR sensor.

9. The wiping system of claim 7, wherein the wiping subsystem includes a cantilevered member overhanging a portion of the LIDAR sensor.

10. The wiping system of claim 9, wherein the cantilevered member is coupled to a wiper frame element, and wherein the wiper frame element supports the wiper blade.

11. The wiping system of claim 9, wherein the electric motor includes an armature and wherein the armature of the electric motor extends generally parallel to the circular lens of the LIDAR sensor.

* * * * *